(12) United States Patent
Okada et al.

(10) Patent No.: US 6,721,550 B1
(45) Date of Patent: Apr. 13, 2004

(54) DIVERSITY RECEIVER

(75) Inventors: Kouta Okada, Kasuga (JP); Makoto Taromaru, Fukuoka-ken (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 09/539,778

(22) Filed: Mar. 31, 2000

(30) Foreign Application Priority Data

Apr. 5, 1999 (JP) .......................................... 11-097310

(51) Int. Cl.⁷ ................................................ H04B 1/06
(52) U.S. Cl. ..................... 455/277.1; 455/562; 455/13.3
(58) Field of Search .................... 455/277.1, 13.3, 455/274, 275, 575, 562, 550, 277.2, 347, 134, 135, 136, 276.1, 133, 63, 137, 121, 129, 269.25, 276, 278, 273, 503, 67.16; 371/5.5; 370/334, 29, 210, 338, 337, 310, 442, 331, 519, 346, 328, 342, 480, 332; 375/347, 100, 267, 200, 144; 358/181, 178, 172; 340/2.1, 2, 7

(56) References Cited

U.S. PATENT DOCUMENTS

| | | | | |
|---|---|---|---|---|
| 4,814,882 A | * | 3/1989 | Nuimura | 358/181 |
| 4,977,616 A | * | 12/1990 | Linder et al. | 455/277 |
| 5,465,411 A | * | 11/1995 | Koike | 455/275 |
| 5,561,673 A | * | 10/1996 | Takai et al. | 371/5.5 |
| 5,991,613 A | * | 11/1999 | Euscher et al. | 455/277.1 |
| 6,067,449 A | * | 5/2000 | Jager | 455/277.2 |
| 6,118,773 A | * | 9/2000 | Todd | 370/334 |

FOREIGN PATENT DOCUMENTS

| | | | | |
|---|---|---|---|---|
| JP | 57010542 | | 1/1982 | |
| JP | 6140971 | | 5/1994 | |
| JP | 06-140971 | * | 5/1994 | H04B/7/26 |
| JP | 6204925 | | 7/1994 | |

\* cited by examiner

*Primary Examiner*—Edward F. Urban
*Assistant Examiner*—C. Chow
(74) *Attorney, Agent, or Firm*—Stevens, Davis, Miller & Mosher, LLP

(57) ABSTRACT

A diversity receiver with simplified construction, excellent receiving signal quality even with very low fading speeds wherein, on the basis of a signal from a receiving unit capable of detecting the receiving signal intensity, an antenna changeover is effected when the receiving signal intensity falls below a changeover threshold value. When, at the termination of a first lapse time from the first antenna changeover, the receiving signal intensity is below that immediately before the first antenna changeover, an antenna changeover is again effected and any antenna changeover is prevented from being effected for a second lapse time from the second changeover. The second lapse time is set to be longer than the first lapse time.

14 Claims, 9 Drawing Sheets

FIG. 9
PRIOR ART (a) ANTENNA CHANGEOVER DIVERSITY PURSUANT TO SWITCH AND STAY(SS) METHOD (b) ANTENNA CHANGEOVER DIVERSITY PURSUANT TO SWITCH AND EXAMINE(SE) METHOD

DIVERSITY RECEIVER

BACKGROUND OF THE INVENTION

The present invention relates to diversity receivers used in radio communication concomitant with fading.

Diversity reception has been known as means for mitigating the influence of fading in radio communication and recently, has been used widely in a radio apparatus for mobile communication such as car telephone or portable telephone in which deep fading due to movement of a station of its own or a mate station is generated.

The most general diversity receiver is of the post-detection synthesis type in which there are provided a plurality of antennas and a plurality of receiving units provided in association with individual antennas and output signals of the individual receiving units are subjected to a selection/synthesis process under a condition that, for example, output signals of higher receiving signal intensity (electric field intensity, and represented by symbol RSSI) are preferentially processed, thus producing a reception output signal. But, the post-detection synthesis type has a disadvantage that the plurality of receiving units are needed as above, with the result that the construction is complicated and increased in scale and the apparatus cost becomes high.

To eliminate the disadvantage, an antenna changeover diversity receiver has been proposed in which a single receiving unit and a plurality antennas are provided and reception is carried out by suitably switching the antennas under a suitable condition.

Figure 8:
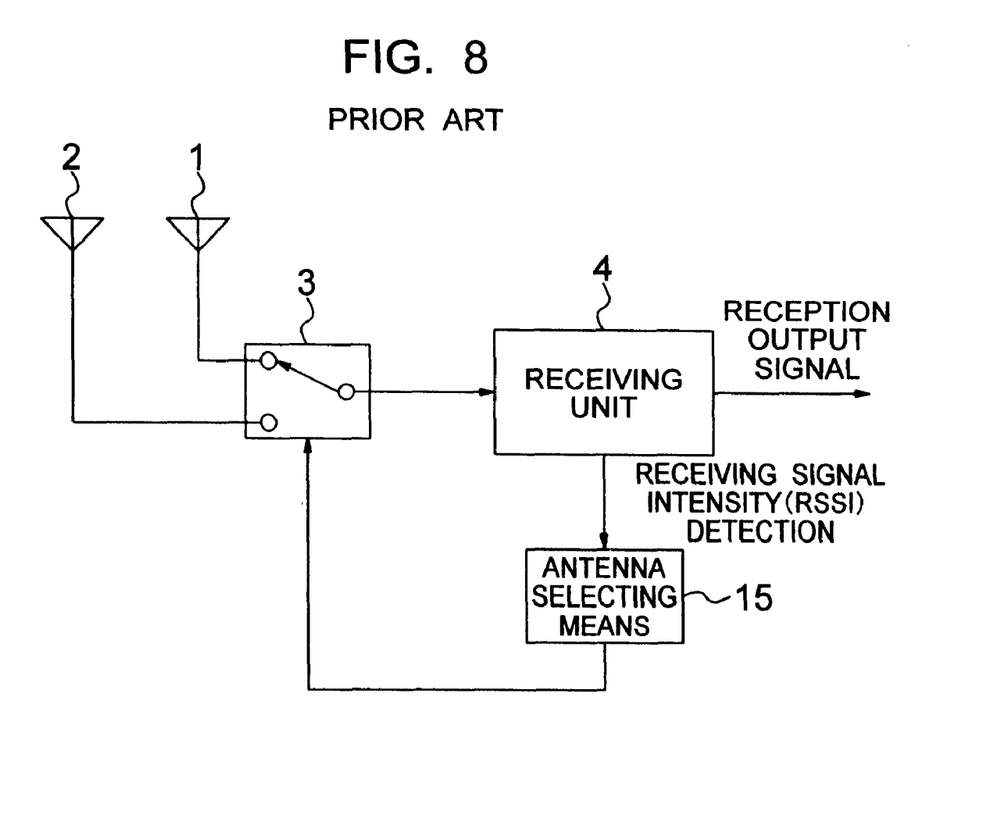
FIG. 8 is a block diagram of a conventional antenna changeover type diversity receiver.

A conventional diversity receiver will be described with reference to the accompanying drawings. FIG. 8 is a block diagram of the conventional antenna changeover diversity receiver. In FIG. 8, one of antennas 1 and 2 is selected by an antenna changeover switch 3. A receiving unit 4 demodulates a desired signal from a high-frequency signal received through the antenna 1 or 2 and delivers a reception output signal. Antenna selecting means 15 controls the antenna changeover switch 3 when RSSI falls below a predetermined changeover threshold value to cause the antenna changeover switch 3 to transfer from one antenna now in connection (now connected to the receiving unit 4) to the other.

For the antenna changeover diversity reception, two methods called a switch and stay method (SS method) and a switch and examine method (SE method) have been known as detailed in, for example, a literature "Base of Mobile Communication" compiled under the supervision of Okumura and Shinshi, issued by the Institute of Electronic Information and Communication Engineers of Japan, 1986.

Figure 9:
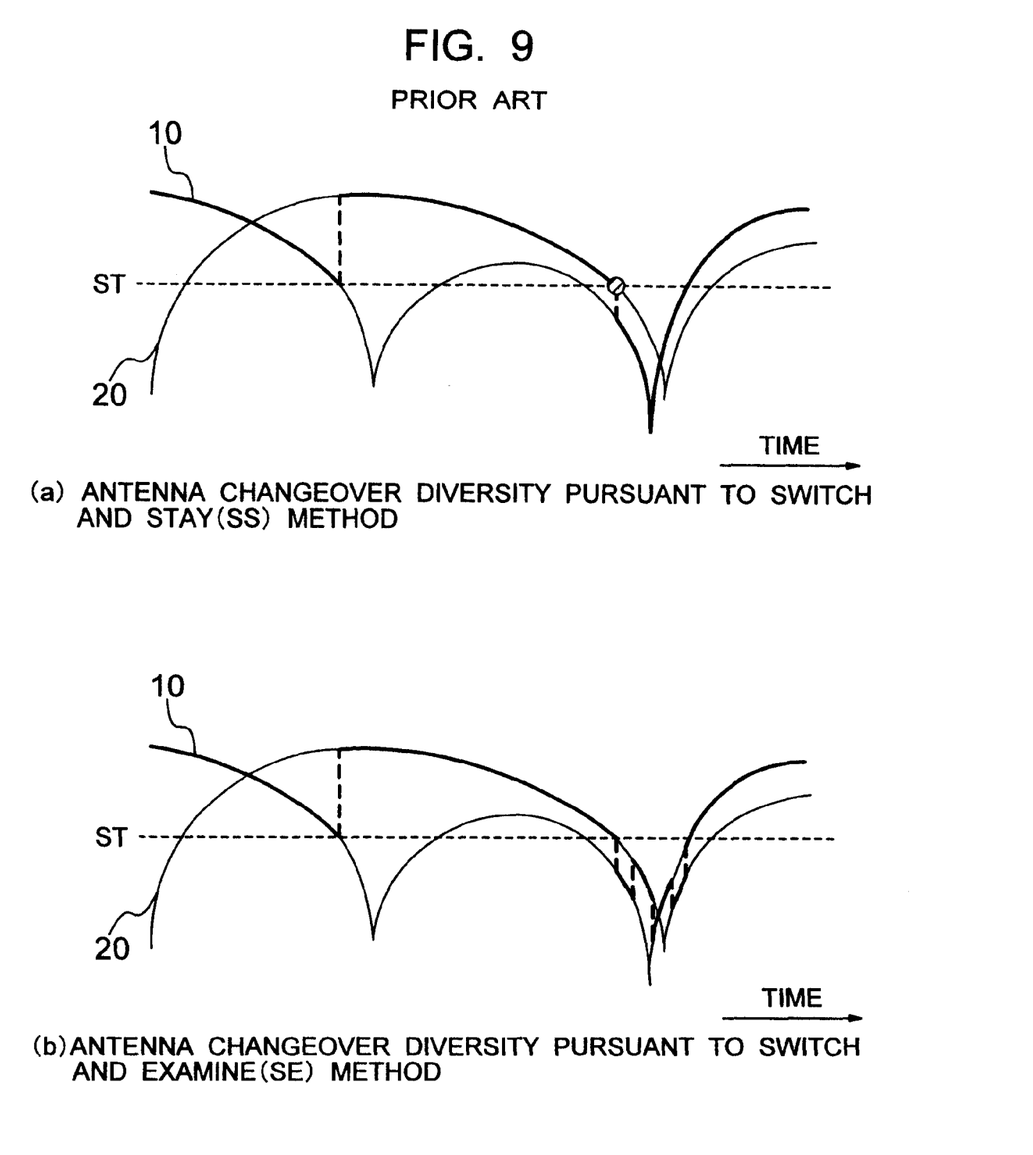
FIG. 9 is a graphic representation useful in explaining the operation of the conventional diversity receiver.

FIG. 9 is a diagram for explaining the operation of the conventional diversity receiver. Changeover behavior pursuant to the SS method is illustrated at section (a) in FIG. 9 and changeover behavior pursuant to the SE method is illustrated at section (b) in FIG. 9. The operation of the conventional antenna changeover diversity receiver will be described below. In FIG. 9, RSSI for the antenna 1 is indicated by reference numeral 10 and RSSI for the antenna 2 is indicated by reference numeral 20. Especially, in the figure, thick curve represents RSSI for one antenna connected to the receiving unit 4 through the changeover switch 3 and thin curve represents RSSI for the other antenna disconnected from the receiving unit 4.

It is now assumed that the antenna 1 is in connection and RSSI changes owing to fading during reception as shown at (a) and (b) in FIG. 9. As the RSSI falls below the predetermined threshold value, a changeover signal is sent to the antenna changeover switch 3 and instead of the antenna 1, the antenna 2 is connected to the receiving unit. Consequently, the RSSI at the receiving unit 4 traces thick curve shown in FIG. 9.

If the distance between the antennas 1 and 2 is sufficient, the correlation between instantaneous values of RSSI for the antennas 1 and 2 is low and there is a high probability that while the RSSI for one antenna is very low, the RSSI for the other antenna is higher. Accordingly, the probability that the antenna for which the RSSI is higher is selected is high and a more excellent reception output signal than that of a receiver devoid of diversity can be obtained.

But an instance sometimes occurs in which RSSI immediately after a changeover happens to be lower than the threshold value. In such an event, pursuant to the SE method, the antenna changeover is again carried out, continuing until the RSSI becomes higher than the threshold value but pursuant to the SS method, the antenna changeover is not effected and reception by the antenna now in connection remains until the RSSI becomes higher than the threshold value. According to the aforementioned literature "Base of Mobile Communication", an average of signal to noise (S/N) ratios in the SE method is equal to that in the SS method if changeover noise generated concomitantly with a changeover is neglected. Accordingly, in the case of radio systems or broadcasting reception in which a continuous wave of, for example, analog FM or analog AM modulation is transmitted, the SS method is often used because the number of changeover operations is smaller.

Further, for improving the characteristics of the antenna changeover diversity receiver, methods have been proposed including one as disclosed in JP-A-57-10542, according to which the frequent changeover operations are prevented by lowering the threshold value after the antenna changeover, and including another as disclosed in JP-A-6-140971, according to which when the RSSI even after the antenna changeover is below the changeover threshold value, the connection of the preceding antenna is recovers.

In the aforementioned diversity receivers, however, the reception performance is disadvantageously degraded when the fading speed becomes very low at the time that the user of cordless telephone or portable telephone stops or the user keeping still uses the telephone.

More specifically, when RSSI even after an antenna changeover falls below the changeover threshold value in the SE method shown at (b) in FIG. 9, changeovers occur sequentially as described above. Since the change speed of the RSSI is slow, the sequential changeover continues for a long time, Consequently, changeover noise takes place in a demodulated signal for a long time and the communication quality is degraded. In the case of transmission of digital data, a bit error due to changeover noise can be corrected by using a correction code.

In the digital transmission, however, sections generally called frames each being a unit of several of tens of bits or several of hundreds of bits are transmitted and the correctable number of bits is limited to several bits or several of tens of bits or less and the ability to correct the bit error is exceeded when the changeover occurs frequently.

On the other hand, in the case of the SS method, the frequent changeover can be avoided but when the RSSI rather lowers after the antenna changeover, that is, when the RSSI after the antenna changeover is rather degraded, connection of the antenna for which the RSSI is lower sometimes remains for a long time, thus degrading the receiving performance.

SUMMARY OF THE INVENTION

The present invention contemplates elimination of the above problems and it is an object of the present invention to provide a diversity receiver which can obtain, with simplified construction, good communication quality regardless of the fading speed.

To accomplish the above object, a diversity receiver according to a first aspect of the invention comprises an antenna changeover switch for connecting one of a plurality of antennas to deliver a receiving signal, a receiving unit connected to the antenna changeover switch to demodulate the receiving signal sent from the antenna changeover switch and detect signal intensity of the receiving signal, and antenna selecting means for comparing the receiving signal intensity detected by the receiving unit with a changeover threshold value so as to control the antenna changeover switch, wherein the antenna selecting means controls the antenna changeover switch such that when the receiving signal intensity falls below the changeover threshold value under a state that one antenna is selected, the antenna selecting means causes the antenna changeover switch to transfer from the one antenna to a second antenna and when, at the termination of a first lapse time from the first transfer, the receiving signal intensity is below that immediately before the first transfer, the antenna selecting means again causes the antenna changeover switch to transfer from the second antenna to the one antenna, the antenna selecting means being prevented from causing the antenna changeover switch to transfer until a second lapse time from the second transfer expires.

With this construction, when the receiving signal intensity (RSSI) rather decreases after the first transfer, the antenna changeover is again carried out and then, the changeover is not effected during the second lapse time, thereby ensuring that frequent changeover can be prevented and besides a longtime connection, to the receiving unit, of an antenna for which the receiving signal intensity is low (or a longtime transfer of the antenna changeover switch to an antenna for which the receiving signal intensity is low) can be avoided. Accordingly, the diversity receiver can be provided which can obtain, with the simplified construction, good communication quality regardless of the fading speed.

A diversity receiver according to a second aspect of the invention comprises three or more antennas, an antenna changeover switch for connecting one of the antennas to deliver a receiving signal, a receiving unit including a circuit connected to the antenna changeover switch to demodulate the receiving signal from the antenna changeover switch so as to convert it into a baseband signal and detect intensity of the receiving signal, and antenna selecting means for comparing the receiving signal intensity detected by the receiving unit with a changeover threshold value so as to control the antenna changeover switch, wherein the antenna selecting means controls the antenna changeover switch such that when the receiving signal intensity falls below the changeover threshold value, the antenna selecting means causes the antenna changeover switch to perform a first transfer operation in which the antenna change over switch transfers from one antenna to a second antenna and when, at the termination of a first lapse time from the first transfer operation, the receiving signal intensity is below that immediately before the first transfer operation, the antenna selecting means causes the antenna changeover switch to perform a second transfer operation in which the antenna changeover switch sequentially transfers to the remaining antennas, the antenna selecting means being prevented from causing the antenna changeover switch to perform the first transfer operation until a second lapse time from the second transfer operation expires, and the second lapse time is longer than the first lapse time.

With this construction, when the receiving signal intensity (RSSI) rather decreases after the first transfer operation, the antenna changeover switch sequentially transfers to the remaining antennas so as to sequentially retrieve an antenna for which the receiving signal intensity exceeds that immediately before the first transfer operation and connect the retrieved antenna to the receiving unit and after the connection is established, the antenna changeover switch is prevented from transferring until the second lapse time expires, so that even when the number of diversity branches, that is, the number of antennas increases to three or more in order to increase the diversity gain, frequent transfers or changeovers can be prevented and a longtime connection of an antenna for which the receiving signal intensity is low can be avoided.

Alternatively, the second lapse time is not constant but is changed suitably. With this construction, the time interval for antenna changeover becomes non-uniform and an uncomfortable feeling due to changeover noise given to audibility can be decreased.

Preferably, the second lapse time is set by adding pseudo-random numbers to the first lapse time. With this construction, the time interval for antenna changeover becomes irregular (random) and an uncomfortable feeling due to changeover noise given to audibility can be lowered.

DESCRIPTION OF THE EMBODIMENTS (First Embodiment)

Referring to FIGS. 1 to 4, a first embodiment of a diversity receiver according to the present invention will be described. The construction of the diversity receiver in the present embodiment is identical to that of the conventional diversity receiver shown in FIG. 8 with the exception of the circuit construction and operation antenna selecting means. The antenna selecting means, as designated by reference numeral 5 in FIG. 4, operates in accordance with algorithm to be described later so as to control antenna changeover switch 3.

Figure 4:
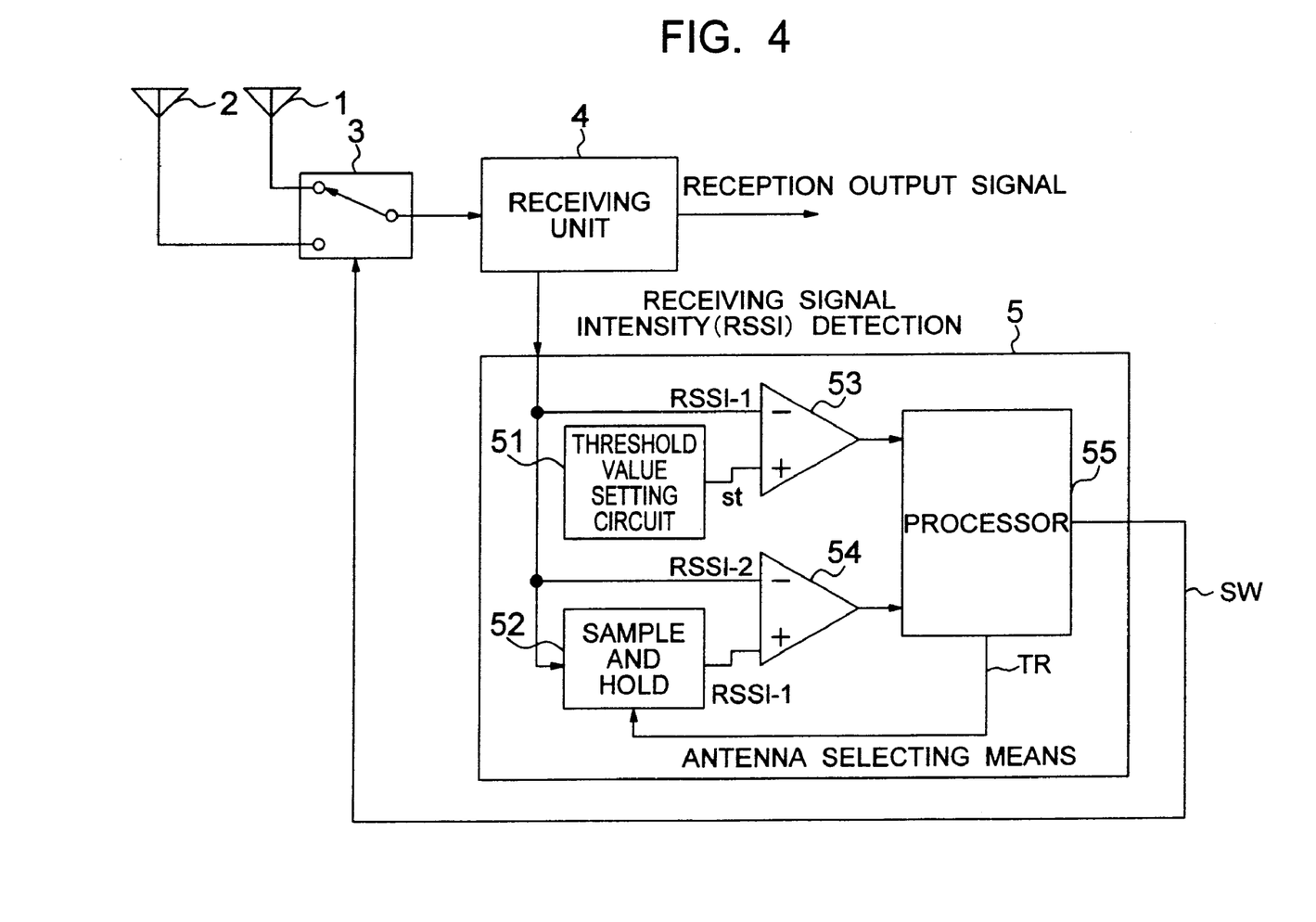
FIG. 4 is a block diagram of the diversity receiver according to the first embodiment.

In the diversity receiver of the present embodiment constructed as shown in FIG. 4, one of antennas 1 and 2 is selected by the antenna changeover switch 3. A receiving unit 4 receives a desired electric wave through the antenna selectably 1 or 2 connected by the antenna changeover switch 3 to the receiving unit and demodulates the electric wave to convert into a base band signal, and supply a reception output signal. The receiving unit 4 can detect an instantaneous value of receiving signal intensity (hereinafter simply referred to as RSSI).

The antenna selecting means 5 controls the antenna changeover switch 3 on the basis of RSSI sent from the receiving unit 4. For example, in case the antenna 1 is now selected to be in connection (connected to the receiving unit 4 through the switch 3), the antenna selecting means 5 sends a changeover command signal SW to the antenna changeover switch 3 when the RSSI falls below a changeover threshold value and the antenna changeover switch 3 responds to the changeover command signal SW to transfer to the antenna 2 so as to connect it to the receiving unit 4. Alternatively, if the antenna 2 is now in connection, the antenna changeover switch follows the changeover signal SW to transfer to the antenna 1.

Figure 3:
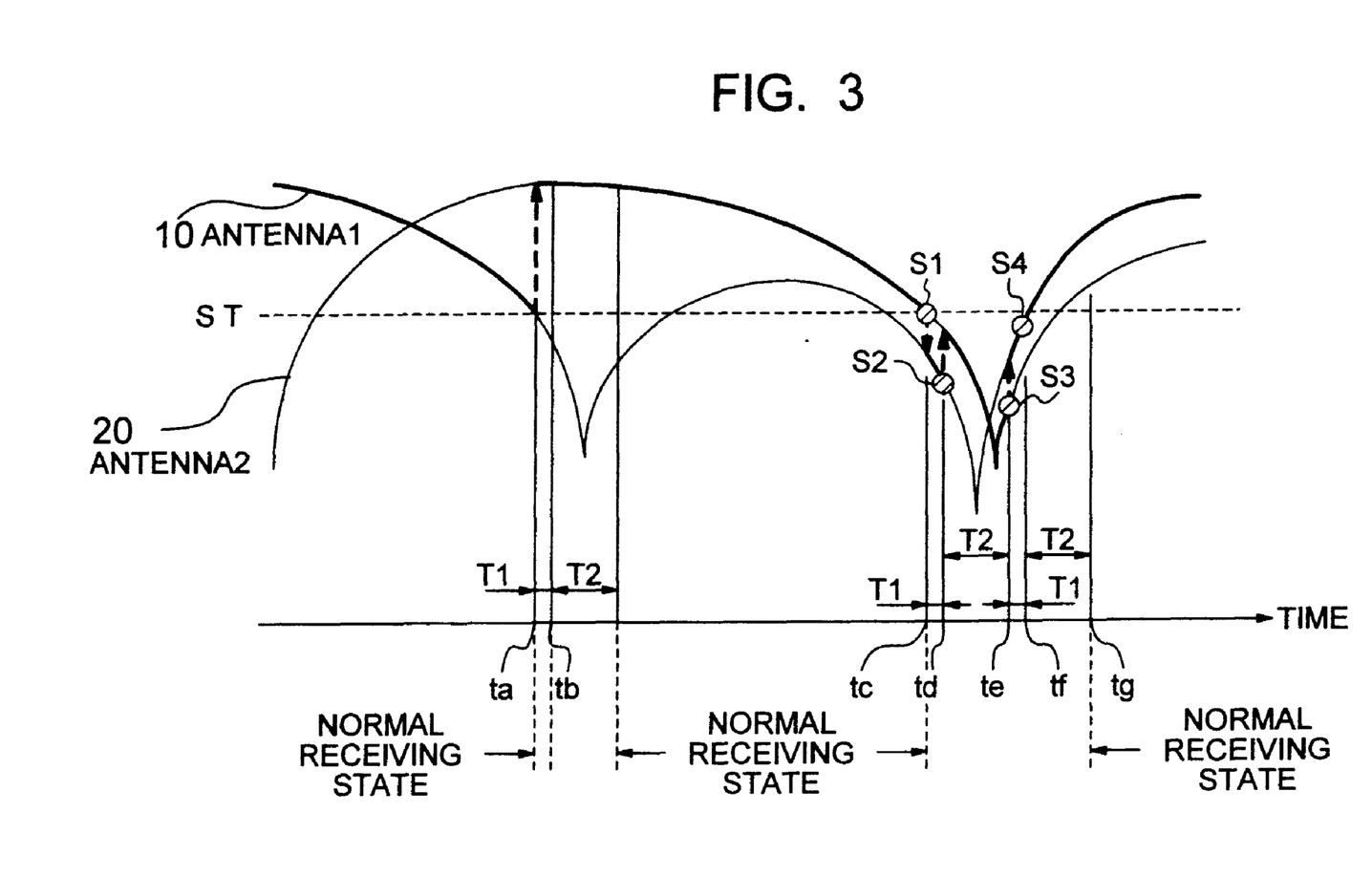
FIG. 3 is a graphic representation useful to explain the operation of the diversity receiver according to the first embodiment.

Next, an antenna changeover method in the diversity receiver of the present embodiment will be described in greater detail with reference to FIG. 3 useful to explain the operation of the diversity receiver. In FIG. 3, RSSI for the antenna 1 is indicated by reference numeral 10 and RSSI for the antenna 2 is indicated by reference numeral 20. Thick curve represents RSSI for the antennas alternatively connected to the receiving unit 4 by means of the antenna changeover switch 3 and thin curve represents RSSI for the antennas alternatively disconnected from the receiving unit. Changeover threshold value ST is represented by dotted line. A first lapse of time representing an RSSI measurement waiting time (as mentioned herein later, a predetermined time not to measure RSSI) is indicated by T1 and a second lapse of time representing a changeover prohibit time (a time to prohibit antenna changeover after T1) is indicated by T2.

In a normal receiving state, the antenna selecting means 5 constantly monitors RSSI sent from the receiving unit 4. When the RSSI changes owing to fading during reception, the antenna selecting means 5 compares the RSSI with the changeover threshold value. As the RSSI falls below the threshold value, the antenna selecting means sends a changeover command signal SW to the antenna changeover switch 3. The antenna changeover switch 3 follows the command signal SW to transfer from one antenna to the other.

Figure 1:
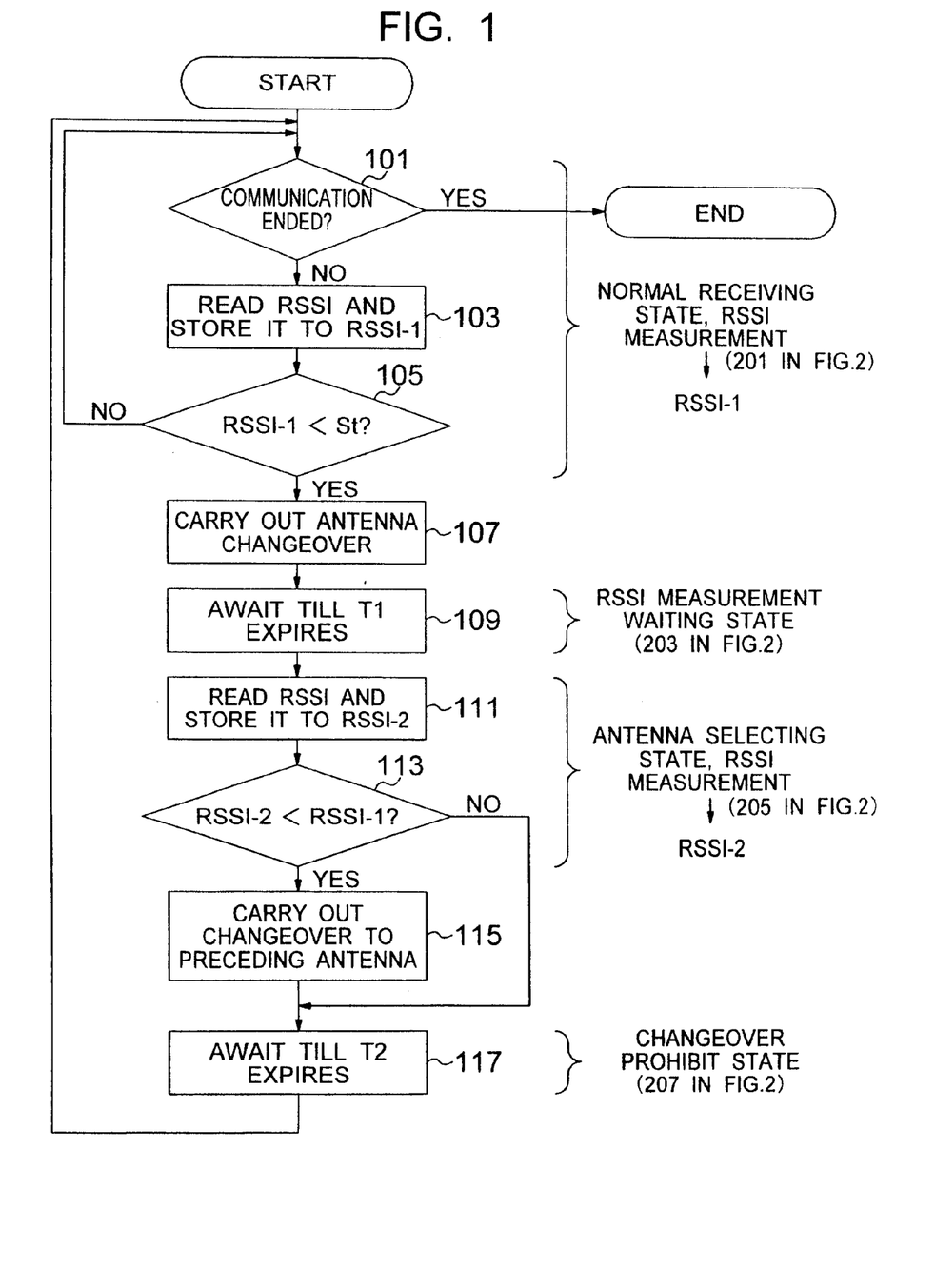
FIG. 1 is a flow chart showing the operation of a diversity receiver according to a first embodiment of the present invention.
Figure 2:
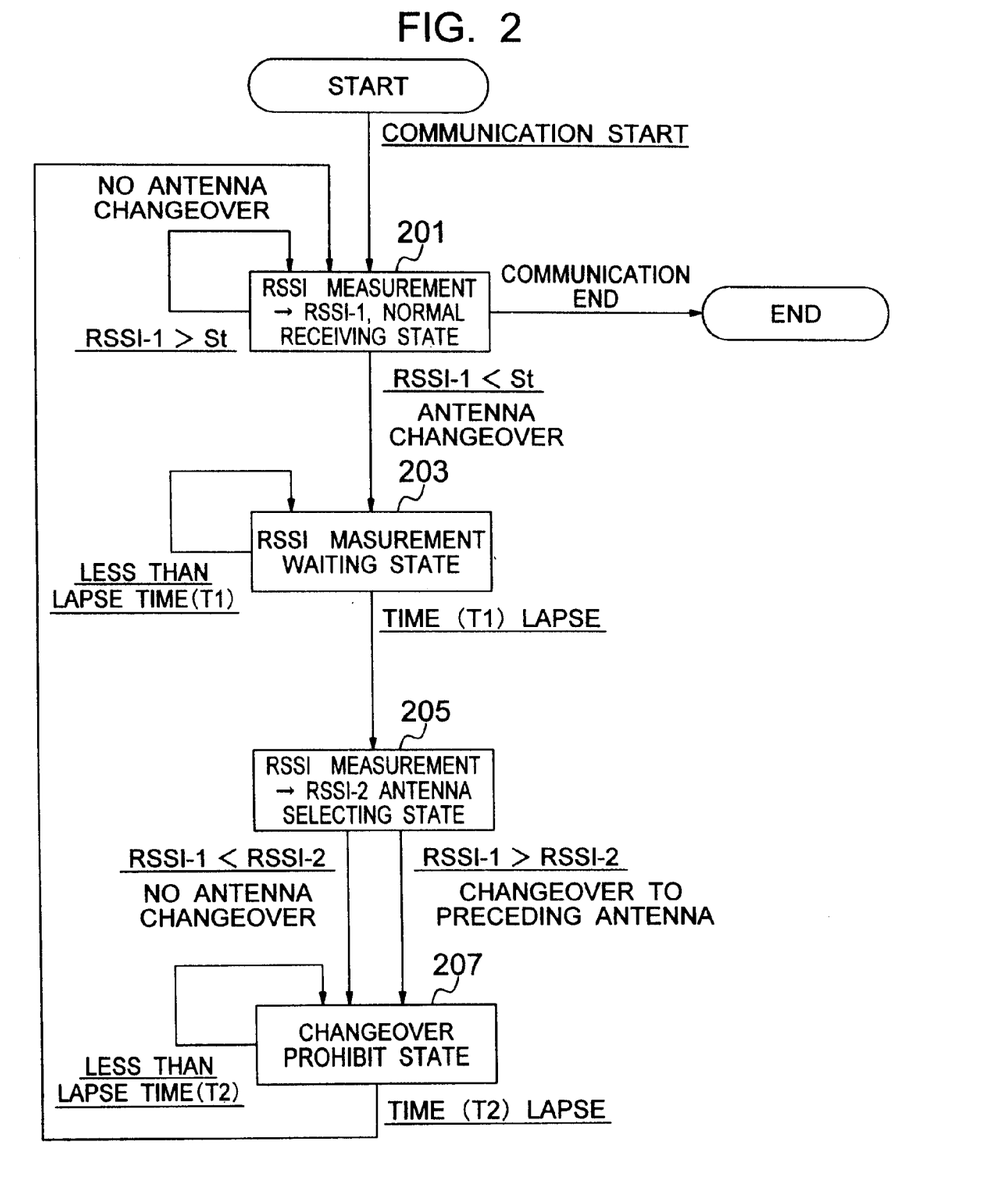
FIG. 2 is a diagram showing state transition in the operation of the diversity receiver according to the first embodiment.

For example, it is assumed that the antenna 1 is in connection by means of the antenna changeover switch 3 and a normal receiving state proceeds (steps 101–105; 201). The normal receiving state is indicated in FIGS. 1 and 2 showing an operational flow chart and an operational state transition, respectively, in the diversity receiver of the present embodiment. With the antenna 1 connected, RSSI for the antenna 1 is depicted by thick curve as shown on the left side in FIG. 3. The RSSI measured with the antenna 1 stored in RSSI-1 (step 103), and compared with the threshold value ST (step 105). When the RSSI stored in RSSI-1 falls below the changeover threshold value ST at time point ta as shown in FIG. 3, a changeover command signal SW is sent from the antenna selecting means 5 to the antenna changeover switch 3, which follows the command signal to transfer to the other antenna 2 so as to establish a RSSI measurement waiting state (step 109; 203) as shown in FIGS. 1 and 2.

After the RSSI measurement waiting time T1 has elapsed or at the termination of the RSSI measurement waiting time T1, an antenna selecting state (steps 111, 113; 205) as shown in FIGS. 1 and 2 is established at time point tb at which RSSI is again measured. The RSSI measured (with the antenna 2 at the time point) is stored in RSSI-2 (step 111). Symbols "RSSI-1" and "RSSI-2" represent, for example, variables for computer program processing or memory areas. In the example shown in FIG. 3, RSSIs stored in the RSSI-1 and RSSI-2 are compared (step 113), RSSI at time point tb is above the RSSI before changeover and hence, the connection of the antenna 2 keeps. Subsequently, the changeover prohibit time T2 has elapsed and the normal receiving state recovers (steps 101–105; 201). In the normal receiving state, it continues to be decided whether the RSSI falls below the changeover threshold value ST.

Subsequently, when the RSSI under the connection of the antenna 2 to the receiving unit takes a value (S1) below the changeover threshold value ST at time point tc (step 105), a changeover command signal SW is sent to the antenna changeover switch 3, thereby bringing the antenna 1 into connection (step 107) and establishing a RSSI measurement waiting state (step 109; 203). When the RSSI waiting time T1 has elapsed at time point td, an antenna selecting state is established (step 205) and the RSSI measurement resumes with the selection of antenna 1. The RSSI at time point td takes a value of S2 which is lower than the RSSI value (S1) before the changeover and therefore, a changeover command signal SW is again sent to the antenna changeover switch 3 and the connection of the antenna 2 to the receiving unit is recovers (step 115). During the changeover prohibit time T2 following the transfer of the antenna changeover switch 3 to the antenna 2, no changeover is carried out regardless of the value of the RSSI to keep the state of the antenna 2 in connection (step 117; 207).

After the changeover prohibit time T2 has elapsed, the normal receiving state recovers (step 21) and it is decided whether RSSI is below the changeover threshold value ST (step 15). When it is determined that the RSSI (S3) at time point te is below the changeover threshold value ST, the antenna changeover is again carried out to connect the antenna 1 to the receiving unit (step 107) and a RSSI measurement waiting state is established (step 109; 203). At time point tf following the lapse of the RSSI waiting time T1, an antenna selecting state is established and RSSI is again measured (step 111; 205).

At time point tf, the RSSI has a value S4 which is higher than the value of RSSI (S3) before the changeover (step 113) and therefore the state of the antenna 1 in connection remains and no changeover takes place during the changeover prohibit time T2 (step 117; 207). After the changeover prohibit time T2 has elapsed, the normal receiving state recovers (step 201) and if RSSI has a value in excess of the threshold value ST (step 105), the connection of the antenna 1 to the receiving unit remains.

The amplitude of a signal passing through a bandpass filter for channel selection provided in, for example, an intermediate-frequency amplifying stage, that is, the RSSI signal obtained by the receiving unit 4 transiently changes owing to the antenna changeover. Therefore, the aforementioned RSSI measurement waiting time Ti is provided to delay the RSSI measurement by the predetermined time until the transient change extinguishes. Accordingly, the value of T1 may be selected to be, for example, twice or more the reciprocal of the passband of that filter. The time for prohibiting the changeover of antenna may be set to be a time interval during which frequent generation of changeover noise due to frequent changeovers giving an uncomfortable feeling to audibility can be concealed. Preferably, the time interval meeting the above requirements may be, for example, about 0.2 to 1 second. In the case of communication for performing digital transmission, a time interval which does not substantially matter in connection with error correction and retransmission control processing, for example, a time interval longer than the data frame length may be set.

The antenna selecting means 5 controllable as described above can be implemented easily by an analog/digital conversion circuit for analog/digital conversion of RSSI signal and a processor such as a microcomputer having a program conforming to the above control operation.

As described above, when RSSI after an antenna changeover is rather lower than that before the changeover, the preceding antenna connection recovers and consequently, the connection of the antenna for lower RSSI cannot remain in contrast to the conventional SS method. Besides, by virtue of the changeover prohibit state, frequent changeovers as in the SE method can be prevented to thereby provide an excellent reception output signal of less changeover noise.

In the above embodiment, T2 is illustrated as being constant but it may be changed. Specifically, pseudo-random numbers such as maximum periodic sequence may be generated or stored in a memory and read out thereof sequentially so as to be added to T1 or a suitable constant larger than T1. The resulting sum may be used as T2. In such a control operation, the changeover is not carried out periodically even when RSSI's for the both antennas fall below the threshold value, with the result that the changeover period becomes non-uniform and especially, in the case of voice transmission, frequent generation of changeover noise affecting audibility can be concealed more sufficiently.

In the antenna selecting means 5 shown in FIG. 4, RSSI's can be compared by using analog circuits to advantage. In FIG. 4, a processor 55 such as a microcomputer performs the control operation shown in FIGS. 1 and 2, a threshold value setting circuit 51 sets a changeover threshold value, a sample and hold circuit 52 samples a RSSI signal delivered out of the receiving unit 4 by using a trigger signal TR from the processor 55 and holds a sampled value until the next trigger signal TR is applied, a first voltage comparator 53 compares, in the normal receiving state, a RSSI signal (RSSI-1) from the receiving unit 4 with the changeover threshold value ST, and a second voltage comparator 54 compares, in the antenna changeover state, a RSSI signal (RSSI-2) with the RSSI signal (RSSI-1) obtained in the normal receiving state.

The trigger signal TR is issued from the processor 55 during an antenna changeover or immediately before the antenna changeover to cause the sample and hold circuit 52 to hold, during the RSSI measurement waiting state an in the subsequent antenna selecting stat, RSSI value (RSSI-1) occurring immediately before the changeover. With the above construction, any analog/digital converter can be dispensed with and the circuit configuration and the program incorporated in the processor 55 can be simplified.

(Second Embodiment)

Figure 5:
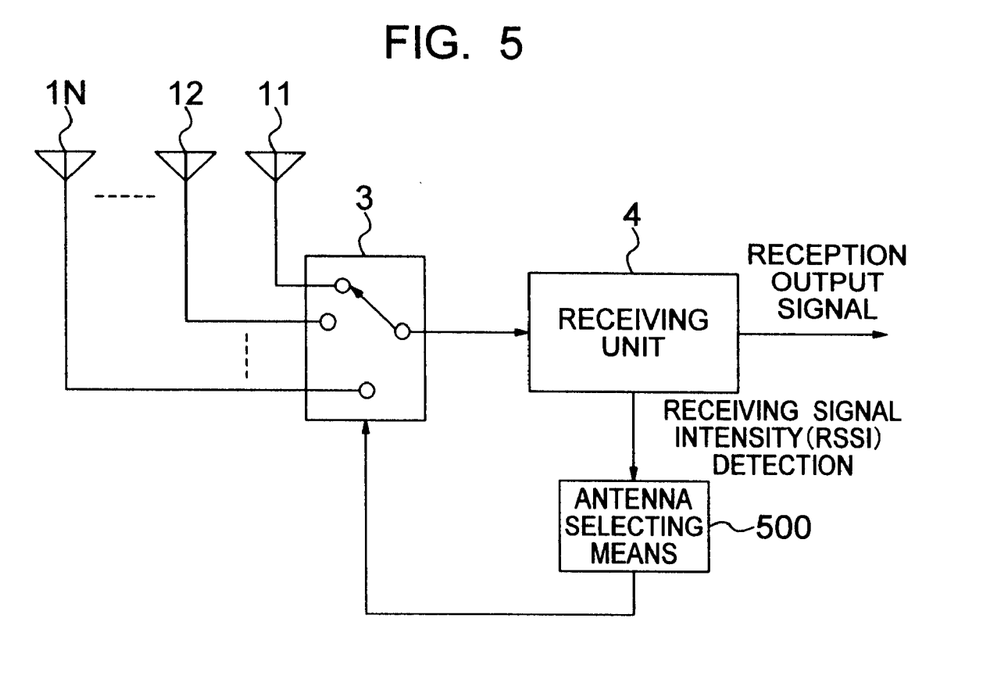
FIG. 5 is a block diagram of a diversity receiver according to a second embodiment of the present invention.

Referring to FIG. 5, there is illustrated, in block form, a second embodiment of the diversity receiver according to the present invention. In FIG. 5, N (N≧3) antennas 11, 12, ..., 1N are provided. An antenna changeover switch 3 selects one of the antennas 11, 12, ..., 1N, and a receiving unit 4 receives a desired electric wave through, for example, the antenna 11 connected to the receiving unit by means of the antenna changeover switch 3 and demodulates the electric wave to deliver a reception output signal. The receiving unit can detect an instantaneous value of RSSI. Antenna selecting means 5 operates in accordance with algorithm to be described later so as to control the antenna changeover switch 3.

Figure 6:
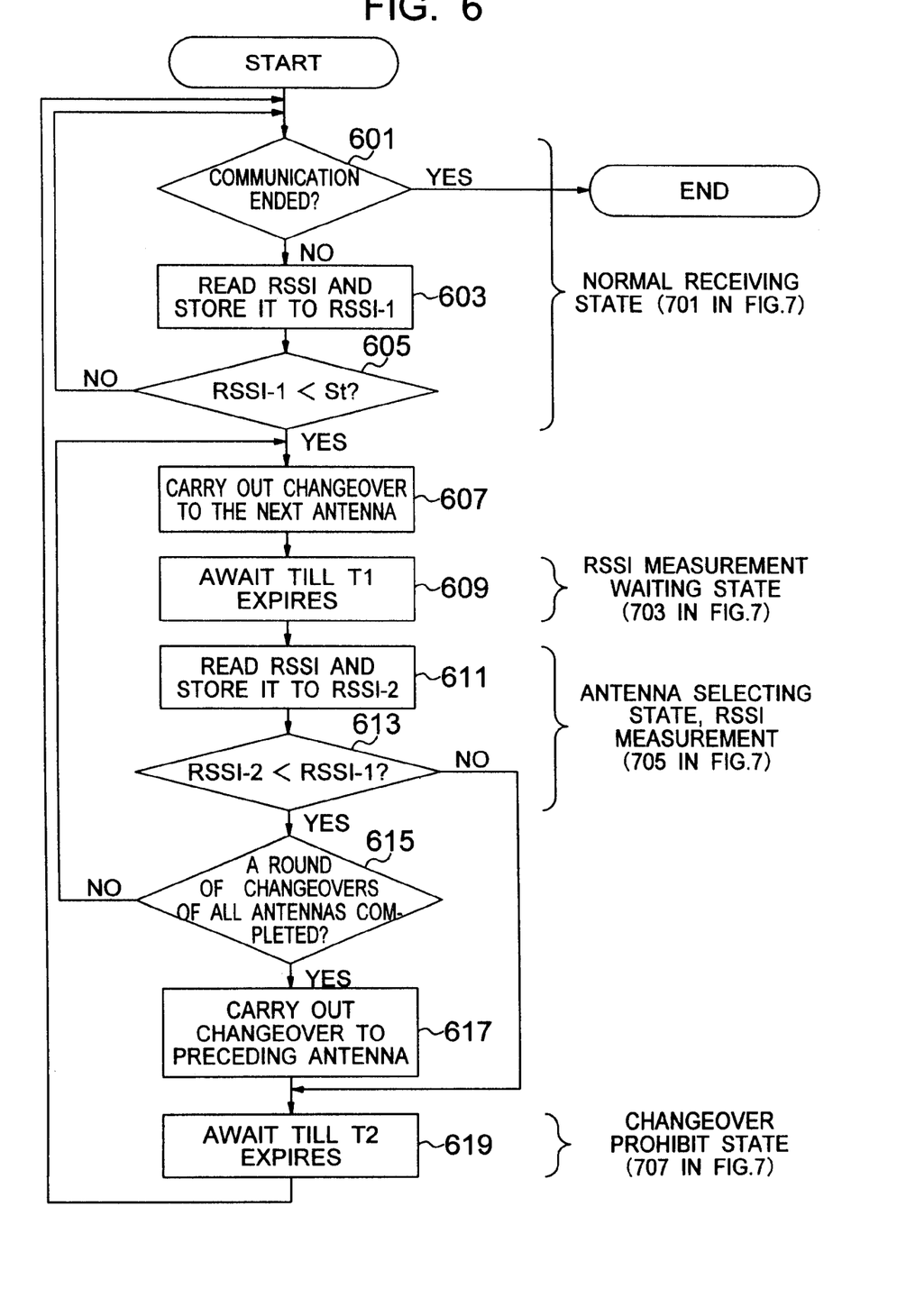
FIG. 6 is a flow chart showing the operation of antenna selecting means in the diversity receiver according to the second embodiment.
Figure 7:
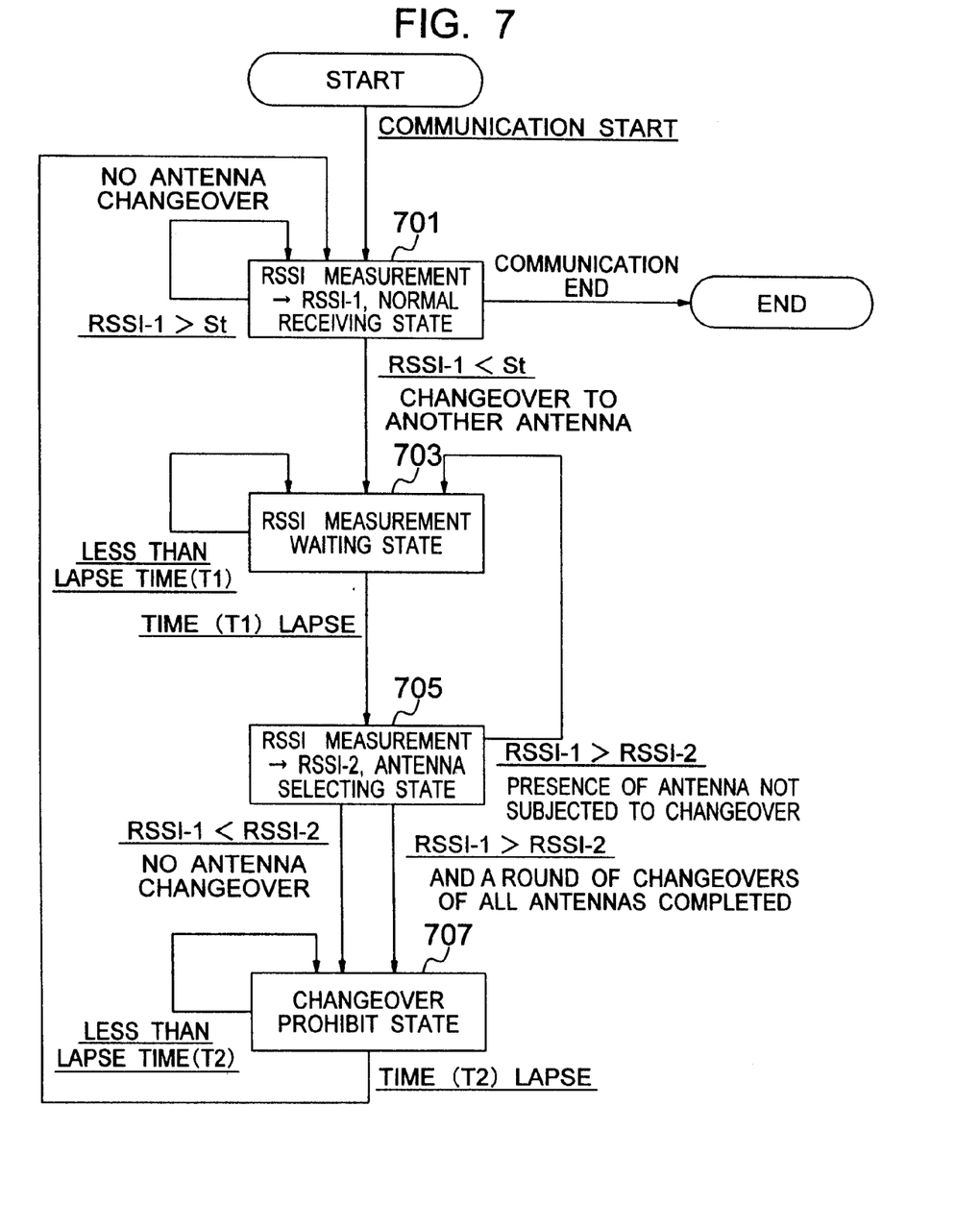
FIG. 7 is a diagram showing state transition in the operation of the diversity receiver according to the second embodiment.

The operation of the diversity receiver constructed as above will be described with reference to FIG. 6 showing a flow chart of the operation of the antenna selecting means in the diversity receiver according to the second embodiment and FIG. 7 showing state transition in the operation.

Firstly, when RSSI changes owing to fading during reception, the antenna selecting means 5 compares the RSSI with the threshold value as in the case of the first embodiment and as the RSSI falls below the threshold value, the antenna changeover switch 3 is caused to transfer. For example, when RSSI falls below the changeover threshold value ST at a time point under a state that the antenna 11 is connected to the receiving unit through the antenna changeover switch 3, the antenna changeover switch 3 transfers to the antenna 12, thereby establishing a RSSI measurement waiting state as shown in FIGS. 6 and 7. Subsequently, at the termination of the RSSI waiting time T1, an antenna selecting state as shown in FIGS. 6 and 7 is established and RSSI is again measured. IF the RSSI measurement value for antenna 12 is higher than the RSSI before the changeover, the connection of the antenna 12 to the receiving unit remains. Besides, if, even after the changeover prohibit time T2, the RSSI measurement value is higher than the RSSI before the changeover, the connection of the antenna 12 to the receiving unit still remains. Further, if the RSSI measurement value is higher than that before the changeover when the changeover prohibit time T2 expires, the normal receiving state recovers while keeping the antenna 12 connected.

Subsequently, when the RSSI falls below the threshold value while the antenna 12 is in connection in the normal receiving state (step 605), the antenna 12 is disconnected and the antenna 13 (not shown) is now connected to the receiving unit (step 607). Then, a RSSI measurement waiting state is established. As the RSSI waiting time T1 expires, an antenna selecting state is established and RSSI is again measured and stored in RSSI-2 (step 611; 705). If the RSSI is lower than the RSSI before the changeover, that is, the RSSI (RSSI-1) measured with the antenna 12 (step 613), the antenna 14 (not shown) is then connected to the receiving unit and a RSSI measurement waiting state is established (step 609; 703). Subsequently, as will be seen from FIGS. 6 and 7, if RSSI in excess of the RSSI-1 is obtained or a round of changeovers circulating through all of the antennas is completed (in this example, when the antenna changeover switch finally transfers to the antenna 1N) (step 615), a changeover prohibit state is established (step 619; 707) and at the expiration of the changeover prohibit time T2, the normal receiving state recovers. The aforementioned T1 and T2 may be set in a manner similar to that explained in connection with the first embodiment.

Through the above operation, when the RSSI falls below the threshold value, an antenna for which the RSSI is in excess of that for the precedently connected antenna can be searched following the intervening RSSI measurement waiting state and diversity reception of three or more branches for higher diversity gain can be permitted. Besides, the changeover prohibit state is established when a round of changeovers circulating through all the antennas is completed to ensure that the changeovers are allowed to occur at a frequency confined within a round of changeovers and the generation of changeover noise can be suppressed.

In the present embodiment, T2 can also be changed as in the case of the first embodiment. Further, RSSI comparison in the antenna selecting means 5 can be implemented similarly to the first embodiment by using analog circuits constructed in FIG. 4.

As described above, according to the present invention implemented with the rather simplified and inexpensive construction having the single receiving unit, when the RSSI for the antenna after antenna changeover is lower, the connection to that antenna for lower RSSI can be prevented from remaining for a long time. Besides, the changeover does not occur frequently and as a result, in the case of transmission of analog voice signal, an uncomfortable feeling given to audibility can be mitigated. In the case of transmission of digital data, a bit error due to changeover noise can be corrected by an error correction code and even when the fading speed is very slow, a diversity receiver of highly excellent characteristics can be provided.

We claim:

1. A diversity receiver comprising:
   an antenna changeover switch for selectively connecting one of a plurality of antennas to deliver a receiving signal;
   a receiving unit, connected to said antenna changeover switch, that demodulates the receiving signal delivered from said antenna changeover switch and detects intensity of the receiving signal; and
   an antenna selector that:
   (i) compares the receiving signal intensity detected by said receiving unit with a changeover threshold value,
   (ii) when a first receiving signal intensity detected with a connection by said changeover switch of a first antenna of said plurality of antennas is below said changeover threshold value, effects a first switching operation of said changeover switch from said first antenna to another one of said plurality of antennas, and
   (iii) after a first definite time lapse after said first switching operation, during which first time lapse a connection by said changeover switch of said another antenna is maintained, and when the receiving signal intensity detected with the connection by said changeover switch of said another antenna is below said first receiving signal intensity detected just before said first switching operation, effects a second switching operation of said changeover switch for connection again of said first antenna and disconnection of said another antenna by said changeover switch and does not effect a switching operation of said changeover switch for a selective connection of a next one of said plurality of antennas until a second definite time lapse after said second switching operation.

2. A diversity receiver according to claim 1, wherein said second time lapse is longer than said first time lapse.

3. A diversity receiver according to claim 1, wherein said antenna selector includes:
   a processor that controls said operations (i), (ii) and (iii);
   a threshold value setting circuit that sets the changeover threshold value;
   a sample and hold circuit that samples the receiving signal intensity detected by said receiving unit in response to a trigger signal applied from said processor and holds a sampled value until the next trigger signal is applied;
   a first voltage comparator that compares the receiving signal intensity detected by said receiving unit in real time in a receiver normal receiving state with the changeover threshold value; and
   a second voltage comparator that compares receiving signal intensity obtained in real time in a receiver selecting state with the sample value held by said sample and hold circuit.

4. A diversity receiver according to claim 3, wherein said sample and hold circuit samples and holds the receiving signal intensity immediately before an antenna changeover in response to a trigger signal applied from said processor upon the antenna changeover to keep holding during a receiving signal intensity measurement waiting state or an antenna selecting state of the receiver.

5. A diversity receiver according to claim 1, wherein said second time lapse is not constant.

6. A diversity receiver according to claim 5, wherein said second time lapse is set by adding pseudo-random numbers to said first time lapse.

7. A diversity receiver according to claim 1, wherein said first time lapse is a predetermined time lapse and said second time lapse is a predetermined time lapse.

8. A diversity receiver comprising:
   a plurality of antennas;
   an antenna changeover switch for selectively connecting one of said plurality of antennas to deliver a receiving signal;
   a receiving unit including a circuit connected to said antenna changeover switch that detects intensity of the receiving signal by demodulating and converting the receiving signal delivered from said antenna changeover switch to a baseband signal; and
   an antenna selector that:
   (i) compares the receiving signal intensity detected by said receiving unit with a changeover threshold value,
   (ii) controls said antenna changeover switch such that, when the receiving signal intensity falls below said antenna changeover threshold value, said antenna changeover switch performs a first transfer operation to transfer from one antenna to another antenna of said plurality of antennas, and when, after termination of a first definite time lapse from the first transfer operation, the receiving signal intensity is below that immediately before the first transfer operation, said antenna changeover switch performs a second transfer operation to transfer from said another antenna to the one antenna, and thereafter, said antenna selector being prevented from causing said antenna changeover switch to effect another transfer until expiration of a second definite time lapse from said second transfer operation, and the second time lapse is longer than the first time lapse.

9. A diversity receiver according to claim 8, wherein said second time lapse is not constant.

10. A diversity receiver according to claim 9, wherein said second time lapse is set by adding pseudo-random numbers to said first time lapse.

11. A diversity receiver according to claim 8, wherein said first time lapse is a predetermined time lapse and said second time lapse is a predetermined time lapse.

12. A diversity receiver comprising:
   three or more antennas;
   an antenna changeover switch for effecting antenna changeover operations to connect a respective one of said antennas to deliver a receiving signal;
   a receiving unit, including a circuit connected to said antenna changeover switch, that detects intensity of the receiving signal by demodulating and converting the receiving signal delivered from said antenna changeover switch to a baseband signal; and an antenna selector that:
(i) compares the detected receiving signal intensity with a changeover threshold value,
(ii) controls said antenna changeover switch to cause a first changeover operation of said changeover switch when the receiving signal intensity falls below said changeover threshold value, to cause a second changeover operation of said changeover switch to connect a subsequent one of said antennas, when, after termination of a first definite time lapse from the first transfer operation, the receiving signal intensity is below the receiving signal intensity immediately before the first transfer operation, and
(iii) thereafter, prevents said antenna changeover switch from causing any further changeover operation until expiration of a second definite time lapse from the second transfer operation; and wherein the second time lapse is longer than the first time lapse.

13. A diversity receiver according to claim 12, wherein said first time lapse is a predetermined time lapse and said second time lapse is a predetermined time lapse.

14. A method for antenna changeover in a diversity receiver having a plurality of antennas and an antenna changeover switch for effecting antenna changeover operations to connect a respective one of the plurality of antennas to a receiving unit, comprising the steps of:

monitoring receiving signal intensity detected by said receiving unit in a normal receiving state;

applying a changeover command signal to said antenna changeover switch when the receiving signal intensity monitored in the normal receiving state falls below a changeover threshold value, and thereafter establishing a receiving signal intensity measurement waiting state for a first predetermined time;

establishing an antenna selecting state after the first predetermined time has elapsed and again measuring receiving signal intensity in the antenna selecting state;

when the receiving signal intensity value measured in the antenna selecting state exceeds that before the preceding changeover operation, establishing a changeover prohibiting state while keeping an antenna connection at that time unchanged;

preventing any antenna changeover operation from being effected for a second predetermined time in the changeover prohibiting state and recovering the normal receiving state after the second predetermined time has elapsed; and when the receiving signal intensity value measured in the antenna selecting state falls below that before the preceding changeover operation, applying again a changeover command signal to said antenna changeover switch, thereafter establishing the changeover prohibiting state to prevent the antenna changeover from being effected for a second predetermined time, and recovering the normal receiving state after the second predetermined time has elapsed.

* * * * *